W. LEWIS.
Cultivators.

No. 143,019.

Patented September 23, 1873.

Witnesses.
C. H. Brown
M. Church

Inventor
W. Lewis
by his Attys.
Hill Ellsworth

UNITED STATES PATENT OFFICE.

WILLIS LEWIS, OF OXFORD, NORTH CAROLINA.

IMPROVEMENT IN CULTIVATORS.

Specification forming part of Letters Patent No. 143,019, dated September 23, 1873; application filed April 3, 1873.

*To all whom it may concern:*

Be it known that I, Dr. WILLIS LEWIS, of Oxford, in the county of Granville and State of North Carolina, have invented a new and improved Cultivator Attachment; and I do hereby declare the following to be a full and exact description of the same, reference being had to the accompanying drawings forming part of this specification, in which—

Figure 1:
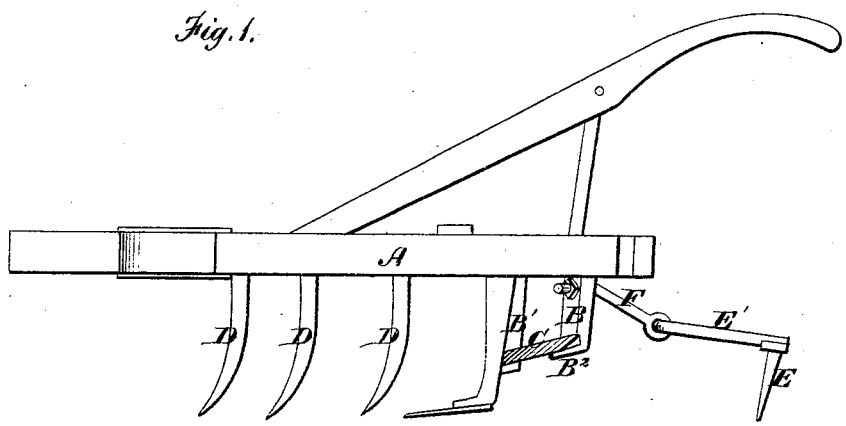
Figure 2:
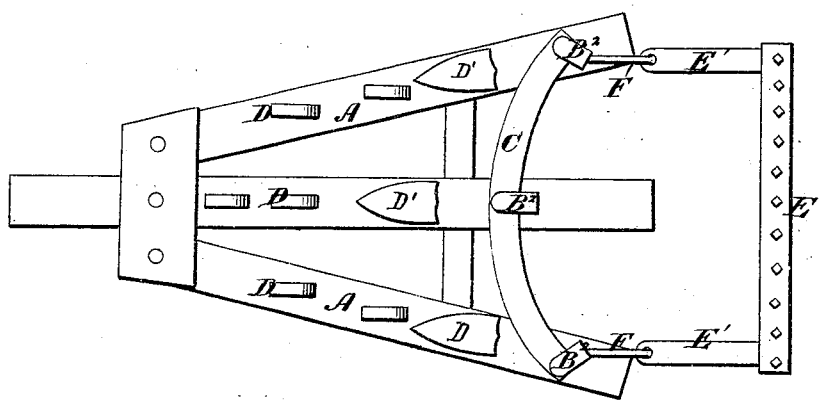

Figure 1 is a side elevation, and Fig. 2 is a plan view of the under side of the cultivator.

Similar letters of reference in the accompanying drawings denote the same parts.

This invention has for its object to provide certain attachments for cultivators that shall serve to shave over the surface of the ground where the cultivator runs, and cut off grass and weeds therefrom, and also to rake over the ground behind the cultivator, collecting the vegetable matter thus cut off, and also roots and other nuisances, and dragging them to the ends of the rows where they can be left. To this end the invention consists in the means for connecting the said attachments to the cultivator, which I will now proceed to describe.

In the accompanying drawings, A is a cultivator. B B¹ are standards, extending downward from the wings of the cultivator, near the rear ends thereof, said standards having feet B² projecting forward, to the upper sides of which feet a curved blade, C, is fastened, at such a height as to run along the surface of the earth while the teeth D penetrate beneath it. This blade cuts off all vegetable growth from between the rows where the cultivator runs. It may be removed, if desired. E is a rake, having at its ends arms E′, extending forward, and pierced so as to receive hooks F, which are connected with the standards B. This rake takes up the weeds cut by the blade C, and also all other substances requiring removal, and drags them to the ends of the rows where they may be deposited. The arms E′ and hooks F give to the rake a certain amount of play, enabling it to conform to the inequalities of the ground. The rake can be separated from the hooks, if preferred. Intermediate between the teeth D and the semicircular blade C are attached a series of share-blades, D′, which penetrate the soil to the same depth as the teeth D and below the semicircular blade C.

I claim as my invention—

The combination of the cultivator-teeth D D′, semicircular blade C, and rake E, as described.

WILLIS LEWIS.

Witnesses:
W. A. PHILPOTT,
R. S. BARNETT.